(12) United States Patent
Zhou

(10) Patent No.: US 11,546,884 B2
(45) Date of Patent: Jan. 3, 2023

(54) METHOD AND DEVICE FOR DETERMINING TIME-FREQUENCY RESOURCE PREEMPTION, USER EQUIPMENT AND BASE STATION

(71) Applicant: BEIJING XIAOMI MOBILE SOFTWARE CO., LTD., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 116 days.

(21) Appl. No.: 16/623,927

(22) PCT Filed: Jun. 23, 2017

(86) PCT No.: PCT/CN2017/089857
§ 371 (c)(1),
(2) Date: Dec. 18, 2019

(87) PCT Pub. No.: WO2018/232757
PCT Pub. Date: Dec. 27, 2018

(65) Prior Publication Data
US 2020/0137723 A1    Apr. 30, 2020

(51) Int. Cl.
*H04W 72/04* (2009.01)
*H04L 1/18* (2006.01)

(52) U.S. Cl.
CPC .......... *H04W 72/04* (2013.01); *H04L 1/1812* (2013.01)

(58) Field of Classification Search
CPC ............ H04W 72/04; H04W 72/1289; H04W 72/042; H04W 24/02; H04W 12/02; H04W 72/1242; H04W 72/0446; H04W 72/1273; H04W 72/0493; H04L 1/1812; H04L 5/0053; H04L 5/0044; H04L 5/0094

See application file for complete search history.

(56) References Cited

U.S. PATENT DOCUMENTS 10,313,044 B2 * 6/2019 Wang ................... H04B 7/1858
10,382,169 B2 * 8/2019 Cao ...................... H04L 1/0079
(Continued)

FOREIGN PATENT DOCUMENTS

CN       106455103 A    2/2017
WO    2016115683 A1    7/2016

OTHER PUBLICATIONS

State Intellectual Property Office of the People's Republic of China, Office Action and Search Report Issued in Application No. 2017800007267, dated Mar. 19, 2019, 44 pages, (Submitted with Machine Translation).

(Continued)

*Primary Examiner* — Hanh N Nguyen
(74) *Attorney, Agent, or Firm* — Arch & Lake LLP

(57) ABSTRACT

A method of determining time-frequency resource preemption includes: receiving and reading first service data sent by a base station; determining a time-frequency resource region corresponding to the first service data failing to be received upon determining that there is the first service data failing to be received, and decoding part or all of service data in the time- frequency resource region and a relevant time-frequency resource region related thereto; and determining that second service data preempts time-frequency resources of the first service data, upon determining that the decoding is successful.

15 Claims, 12 Drawing Sheets

(56) References Cited

U.S. PATENT DOCUMENTS

| | | | |
|---|---|---|---|
| 10,567,142 B2* | 2/2020 | Kim | H04L 1/0043 |
| 10,601,551 B2* | 3/2020 | Ying | H03M 13/6306 |
| 10,925,081 B2* | 2/2021 | Hwang | H04W 72/1273 |
| 2018/0070341 A1* | 3/2018 | Islam | H04W 72/044 |
| 2018/0278454 A1* | 9/2018 | Islam | H04L 1/0038 |
| 2019/0268930 A1* | 8/2019 | Rudolf | H04W 72/1289 |
| 2020/0059327 A1* | 2/2020 | Kini | H04W 72/042 |

OTHER PUBLICATIONS

State Intellectual Property Office of the People's Republic of China, Office Action and Search Report Issued in Application No. 2017800007267, dated Sep. 24, 2019, 30 pages, (Submitted with Machine Translation).

State Intellectual Property Office of the People's Republic of China, Decision of Rejection Issued in Application No. 2017800007267, dated Jan. 15, 2020, 13 pages, (Submitted with Machine Translation).

State Intellectual Property Office of the People's Republic of China, Reexamination Decision Issued in Application No. 2017800007267, dated Nov. 18, 2020, 16 pages, (Submitted with Machine Translation).

European Patent Office, Extended European Search Report Issued in Application No. 17914509.9, dated Nov. 17, 2020, Germany, 11 pages.

Intel Corporation,"Remaining details of DL pre-emption indication",3GPP TSG RAN WG1 NR Ad-Hoc#2, Qingdao, P. R., China,R1-1710575, Jun. 27-30, 2017, 6 pages.

MediaTek Inc.,"URLLC and eMBB DL Multiplexing using CRC masking and multi-bit NACK feedback",3GPP TSG RAN WG1 Meeting #88, Athens, Green, R1-1702745, Feb. 13-17, 2017, 6 pages.

Qualcomm Incorporated,"DCI considerations for CBG-based (re)-Transmissions",3GPP TSG RAN WG1 NR#2, Qingdao, China, R1-1711203, Jun. 27-30, 2017, 6 pages.

ISA State Intellectual Property Office of the People's Republic of China, Written Opinion of the International Searching Authority Issued in Application No. PCT/CN2017/089857, dated Mar. 21, 2018, WIPO, 9 pages.

ISA State Intellectual Property Office of the People's Republic of China, International Search Report Issued in Application No. PCT/CN2017/089857, dated Mar. 21, 2018, WIPO, 6 pages.

Intel Corporation, "Indication of Preemption of DL Transmissions" 3GPP TSG RAN WGI Meeting #89, RI-1707414, May 15, 2017, 6 pages.

Samsung Electronics Co., Ltd. "Summary of E-mail Discussions on Multiplexing EMBB and URLLC in DL" TSG RAN WG 1 NR Ad-hoc Meeting, RI-1700972, Jan. 10, 2017, 23 pages.

* cited by examiner

METHOD AND DEVICE FOR DETERMINING TIME-FREQUENCY RESOURCE PREEMPTION, USER EQUIPMENT AND BASE STATION

CROSS REFERENCE TO RELATED APPLICATION

The present application is the U.S. national phase of PCT Application No. PCT/CN2017/089857 filed on Jun. 23, 2017, which is incorporated herein by reference in its entirety.

TECHNICAL FIELD

The present disclosure relates to the field of communications technology, and in particular, to a method and a device for determining time-frequency resource preemption, user equipment, a base station, and a computer-readable storage medium.

BACKGROUND

With the development of communication technology, $5^{th}$ Generation (5G) of mobile communication technology has emerged. Current service types of the 5G include at least enhanced Mobile Broad Band (eMBB), massive Machine Type Communication (mMTC), Ultra Reliable Low Latency Communication (URLLC) and the like. Though all these services are all data services, requirements for latency and reliability are different. For example, the URLLC service used in areas such as internet of vehicle that require low latency makes a high demand for timeliness, needs to be established timely, and may even be preemptive for prior services. The mMTC service is usually not sensitive to latency and data can be sent at long intervals. One way to achieve efficient transmission of latency-sensitive services is to improve transmission of Hybrid Automatic Repeat reQuest (HARQ) by, for example, making retransmission feedback faster and more accurate.

In Long Term Evolution (LTE), HARQ feedback is performed in units of Transmission Blocks (TBs), and each TB feeds back a 1-bit acknowledgement (ACK) or non-acknowledgement (NACK) message. In order to improve accuracy of retransmission, the $3^{rd}$ Generation Partnership Project (3GPP) proposes retransmission on the basis of Code Block Group (CBG). The CBG is a smaller unit of data in TB and one CBG corresponds to 1 bit of ACK or NACK feedback. Due to a smaller retransmission granularity, position of erroneous transmission can be more accurately reflected, thereby making retransmission more accurate. Due to a smaller amount of data to be retransmitted, the efficiency of retransmission is higher.

However, if a service preemption occurs, for example, in case where a URLLC service approaches when an eMBB service has started transmitting or is about to start transmitting, URLLC will preempt the transmission time-frequency resources of eMBB, so that the original eMBB service will incorrectly deem that eMBB is transmitted erroneously in HARQ feedback, thereby discarding useful URLLC data. How to determine the URLLC preempts time-frequency resources of the eMBB is a technical problem that needs to be solved.

SUMMARY

The present application discloses a method and a device for determining time-frequency resource preemption, user equipment, a base station, and a computer-readable storage medium, so as to determine time-frequency resource preemption between service data.

According to a first aspect of the examples of the present disclosure, a method of determining time-frequency resource preemption is provided, the method includes:

receiving and reading first service data sent by a base station;

when it is determined that there is first service data failing to be received, determining a time-frequency resource region corresponding to the first service data failing to be received, and decoding part or all of service data in the time-frequency resource region and a relevant time-frequency resource region related thereto; and if the decoding is successful, determining that second service data preempts time-frequency resources of the first service data.

In an example, the method further includes:

prior to decoding the part or all of the service data in the time-frequency resource region and its relevant time-frequency resource region, receiving the second service data which is partially or fully encoded and sent by the base station.

In an example, after determining that the second service data preempts the time-frequency resources of the first service data, the method further includes:

preserving the second service data that preempts the time-frequency resources, and sending HARQ feedback information for the first service data to the base station.

In an example, sending the HARQ feedback information for the first service data to the base station includes:

setting reception success/failure state of the first service data, whose time-frequency resources are preempted, as reception success, and sending the HARQ feedback information to the base station; or sending the HARQ feedback information to the base station according to reception success/failure state of first data other than the first service data whose time-frequency resources are preempted.

In an example, the method further includes:

if the decoding fails, flushing pre-cached service data in the time-frequency resource region.

In an example, prior to decoding the part or all of the service data in the time-frequency resource region and its relevant time-frequency resource region, the method further includes:

receiving configuration information sent by the base station, and obtaining the relevant time-frequency resource region according to the configuration information.

In an example, decoding the part or all of the service data in the time-frequency resource region and the relevant time-frequency resource region includes:

Unscrambling the part or all of the service data in the time-frequency resource region and the relevant time-frequency resource region by using a preset scrambling code;

unscrambling the part or all of the service data in the time-frequency resource region and the relevant time-frequency resource region by using the preset scrambling code and verifying a result of the unscrambling; or verifying part or all of the service data in the time-frequency resource region and the relevant time-frequency resource region;

where the preset scrambling code comprises a Radio Network Temporary Identifier (RNTI), and the RNTI comprises a Cell Radio Network Temporary Identifier (C-RNTI) or a new type RNTI.

According to a second aspect of the examples of the present disclosure, a method of determining time-frequency resource preemption is provided, the method includes:

sending first service data to User Equipment (UE); and encoding part or all of second service data, and sending the encoded second service data to the UE, so that the UE decodes part or all of service data in a time-frequency resource region corresponding to first service data failing to be received and a relevant time-frequency resource region related thereto, to determine whether the second service data preempts time-frequency resources of the first service data.

In an example, the method further includes:

prior to encoding the part or all of the second service data, determining that the second service data belongs to a preset scheduling type, and determining that the second service data is able to preempt the time-frequency resources of the first service data.

In an example, determining that the second service data is able to preempt the time-frequency resources of the first service data includes:

when a time-frequency resource region used for scheduling the second service data is within a time-frequency resource region used for scheduling the first service data, determining that the second service data is able to preempt the time-frequency resources of the first service data.

In an example, the method further includes:

after sending the encoded second service data to the UE, sending configuration information to the UE, wherein the configuration information is for informing the UE of information about the relevant time-frequency resource region for the decoding.

In an example, encoding part or all of the second service data includes:

scrambling the part or all of the second service data by using a preset scrambling code; or verifying the part or all of the second service data, and scrambling the verified second service data by using the preset scrambling code; or verifying the part or all of the second service data;

wherein the preset scrambling code comprises an RNTI, and the RNTI comprises a C-RNTI or a new type RNTI.

According to a third aspect of the examples of the present disclosure, a device for determining time-frequency resource preemption is provided, the device includes:

a receiving and reading module configured to receive and read first service data sent by a base station;

a determining and decoding module configured to determine a time-frequency resource region corresponding to first service data failing to be received, and decode part or all of service data in the time-frequency resource region and a relevant time-frequency resource region related thereto, when it is determined that there is the first service data failing to be received after the receiving and reading module reads the first service data; and a determining module configured to determine that the second service data preempts time-frequency resources of the first service data, if the part or all of the service data in the time-frequency resource region and the relevant time-frequency resource region is successfully decoded by the determining and decoding module In an example, the device further includes:

a receiving module configured to receive the second service data which is partially or fully encoded and sent by the base station, before the determining and decoding module decodes the part or all of the service data in the time-frequency resource region and the relevant time-frequency resource region.

In an example, the device further includes:

a preserving and sending module configured to preserve the second service data that preempts the time-frequency resources, and send HARQ feedback information for the first service data to the base station, after the determining module determines that the second service data preempts the time-frequency resources of the first service data.

In an example, the preserving and sending module includes:

a first sending unit configured to set reception success/failure state of the first service data, whose time-frequency resources are preempted, as reception success, and send the HARQ feedback information to the base station; or a second sending unit configured to send the HARQ feedback information to the base station according to reception success/failure state of first data other than the first service data whose time-frequency resources are preempted.

In an example, the device further includes:

a flushing module configured to flush pre-cached service data in the time-frequency resource region, if the part or all of the service data in the time-frequency resource region and the relevant time-frequency resource region is not successfully decoded by the determining and decoding module.

In an example, the device further includes:

a receiving and obtaining module configured to receive configuration information sent by the base station, and obtain the relevant time-frequency resource region according to the configuration information, before the determining and decoding module decodes the part or all of the service data in the time-frequency resource region and the relevant time-frequency resource region.

In an example, the determining and decoding module:

an unscrambling unit configured to unscramble the part or all of the service data in the time-frequency resource region and the relevant time-frequency resource region by using a preset scrambling code; or an unscrambling and verifying unit configured to unscramble the part or all of the service data in the time-frequency resource region and the relevant time-frequency resource region by using the preset scrambling code, and verify a result of the unscrambling; or a verifying unit configured to verify the part or all of the service data in the time-frequency resource region and the relevant time-frequency resource region;

wherein the preset scrambling code comprises an RNTI, and the RNTI comprises a C-RNTI or a new type RNTI.

According to a fourth aspect of the examples of the present disclosure, a device for determining time-frequency resource preemption is provided, the device includes:

a first sending module configured to send first service data to UE; and an encoding and sending module configured to encode part or all of second service data, and send the encoded second service data to the UE after the first sending module sends the first service data, so that the UE decodes part or all of service data in a time-frequency resource region corresponding to the first service data failing to be received and a relevant time-frequency resource region related thereto, to determine whether the second service data preempts time-frequency resources of the first service data.

In an example, the device further includes:

a determining module configured to determine that the second service data belongs to a preset scheduling type and determine that the second service data is able to preempt the time-frequency resources of the first service data, before the encoding and sending module encodes the part or all of the second service data.

In an example, the determining module is configured to determine that the second service data is able to preempt the time-frequency resources of the first service data, when a time-frequency resource region used for scheduling the second service data is within a time-frequency resource region used for scheduling the first service data.

In an example, the device further includes:

a second sending module configured to send configuration information to the UE after the encoding and sending module sends the encoded second service data to the UE, wherein the configuration information is for informing the UE of information about the relevant time-frequency resource region for the decoding.

In an example, the encoding and sending module includes:

a scrambling unit configured to scramble the part or all of the second service data by using a preset scrambling code; or a verifying and scrambling unit configured to verify the part or all of the second service data and scramble the verified second service data by using the preset scrambling code; or a verifying unit configured to verify the part or all of the second service data, wherein the preset scrambling code comprises an RNTI, and the RNTI comprises a C-RNTI or a new type RNTI.

According to a fifth aspect of the examples of the present disclosure, user equipment is provided, the user equipment includes:

a processor; and a memory for storing instructions executable by the processor, wherein the processor is configured to receive and read first service data sent by a base station;

when it is determined that there is first service data failing to be received, determine a time-frequency resource region corresponding to the first service data failing to be received, and decode part or all of service data in the time-frequency resource region and a relevant time-frequency resource region related thereto; and if the decoding is successful, determine that second service data preempts time-frequency resources of the first service data.

According to a sixth aspect of the examples of the present disclosure, a base station is provided, the base station includes:

a processor; and a memory for storing instructions executable by the processor, where the processor is configured to send first service data to UE; and encode part or all of second service data, and send the encoded second service data to the UE, so that the UE decodes part or all of service data in a time-frequency resource region corresponding to first service data failing to be received and a relevant time-frequency resource region related thereto, to determine whether the second service data preempts time-frequency resources of the first service data.

According to a seventh aspect of the examples of the present disclosure, a computer-readable storage medium is provided, the storage medium storing a computer program that, when executed by a processor, causes the processor to implement the method of determining time-frequency resource preemption.

According to an eighth aspect of the examples of the present disclosure, a computer-readable storage medium is provided, the storage medium storing a computer program that, when executed by a processor, causes the processor to implement the method of determining time-frequency resource preemption.

The technical solutions provided by the examples of the present disclosure may include the following beneficial effects.

The time-frequency resource region corresponding to the first service data failing to be received is determined, and the part or all of the service data in the time-frequency resource region and the relevant time-frequency resource region related thereto is decoded. If the decoding is successful, it can be determined that the second service data preempts the time-frequency resources of the first service data, thereby determining time-frequency resource preemption between service data.

The second service data which is partially or fully encoded and sent by the base station is received, thereby providing a condition for determining subsequently whether the second service data preempts the time-frequency resources of the first service data.

The second service data that preempts the time-frequency resources is kept to reserve the useful second service data, so that the second service data can be normally transmitted. The HARQ feedback information for the first service data is sent to the base station, so that the base station can determine the eMBB data that fails to be sent according to the HARQ feedback information, thereby providing a condition for resending the eMBB data that fails to be sent.

The HARQ feedback information may be sent to the base station through a plurality of manners, the implementations being flexible and diverse.

After decoding the part or all of the service data in the time-frequency resource region and the relevant time-frequency resource region, if the decoding fails, the pre-cached service data in the time-frequency resource region is flushed, thereby saving the cache space of the UE.

The configuration information sent by the base station is received, and the relevant time-frequency resource region is obtained according to the configuration information, which is easy to implement.

The part or all of the service data in the time-frequency resource region and the relevant time-frequency resource region can be decoded through a plurality of methods, the implementations being flexible and diverse.

The part or all of the second service data is encoded, and the encoded second service data is sent to the UE, so that the UE may decode the part or all of the service data in the time-frequency resource region corresponding to the first service data failing to be received and the relevant time-frequency resource region, to determine whether the second service data preempts the time-frequency resources of the first service data.

After determining that the second service data belongs to grant free and determining that the second service data is able to preempt the time-frequency resources of the first service data, the part or all of the second service data is encoded, which is advantageous to saving computing resources of the base station.

When the time-frequency resource region used for scheduling the second service data is within the time-frequency resource region used for scheduling the first service data, it is determined the second service data can preempt the time-frequency resources of the first service data, which is easy to implement By sending the configuration information to the UE, the UE may obtain the relevant time-frequency resource region according to the configuration information, so that the part or all of the service data of the determined time-frequency resource region and the relevant time-frequency resource region may be decoded.

The part or all of the second service data may be encoded through a plurality of methods, the implementations being flexible and diverse.

The above general description and the following detailed description are intended to be illustrative and explanatory, and not to be limiting of the present disclosure.

DRAWINGS

The accompanying drawings, incorporated in and constitute part of the specification, illustrate the examples of the present disclosure, and serve to explain the principles of the present disclosure in conjunction with the specification.

DETAILED DESCRIPTION OF THE EMBODIMENTS

Figure 1A:
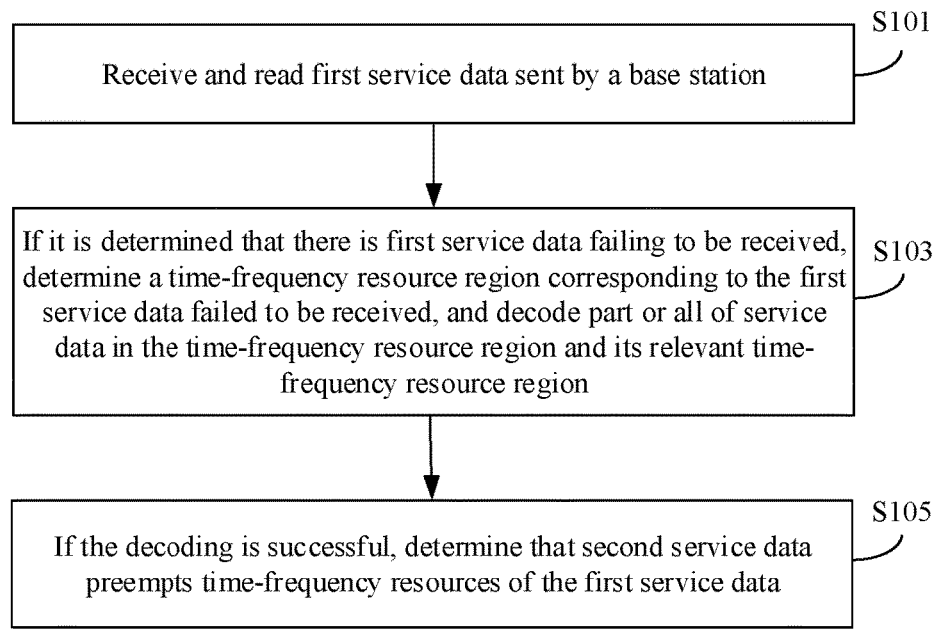
FIG. 1A is a flowchart illustrating a method of determining time-frequency resource preemption according to an example of the present application.

Examples will be described in detail herein, with illustrations thereof represented in the drawings. When drawings are involved in the description below, like numerals in different drawings refers to like or similar elements unless otherwise indicated. The embodiments described in the following examples do not represent all embodiments consistent with the present invention. Instead, they are merely examples of apparatuses and methods consistent with some aspects of the invention as detailed in the appended claims.

FIG. 1A is a flowchart illustrating a method of determining time-frequency resource preemption according to an example of the present disclosure. The example is described from a User Equipment (UE) side. As shown in FIG. 1A, the method of determining time-frequency resource preemption include the followings.

At step S101, first service data sent by a base station is received and read.

In this example, UE may receive the first service data sent by the base station according to preset resource units. The preset resource units may include, but is not limited to, a subframe, a slot, a symbol, a Code Block Group (CBG), and so on. The first service data may include but is not limited to eMBB data.

At step S103, if it is determined that there is first service data failing to be received, a time-frequency resource region corresponding to the first service data failing to be received is determined, and part or all of the service data in the time-frequency resource region and its relevant time-frequency resource region are decoded.

Figure 1B:
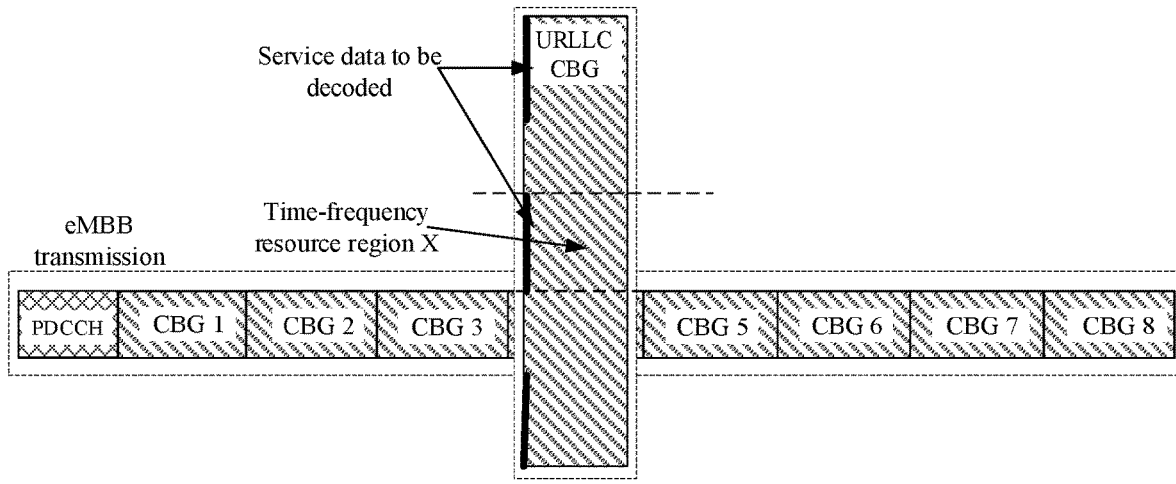
FIG. 1B is a schematic diagram illustrating existing first service data that fails to be received according to an example of the present application.

The time-frequency resource region corresponding to service data refers to a region corresponding to the time domain resources and the frequency domain resources occupied by the service data. The relevant time-frequency resource region of a time-frequency resource region refers to a time-frequency resource region related to at least one of a time domain and a frequency domain of the time-frequency resource region. A time-frequency resource region and its relevant time-frequency resource region usually share certain control information, which may include, but is not limited to, control information that periodically appears in time and frequency, such as a synchronization signal or a reference signal, etc. The relevant time-frequency resource region may include, but is not limited to, a time-frequency resource region adjacent to the time-frequency resource region. As shown in FIG. 1B, the time-frequency resource region corresponding to the first service data failing to be received is the time-frequency resource region corresponding to CBG 4, and an adjacent time-frequency resource region of the time-frequency resource region corresponding to CBG 4 is time-frequency resource region X in FIG. 1B. Include, but is not limited to, control information that periodically appears in time and frequency, such as a synchronization signal or a reference signal, etc.

In this example, decoding the part or all of the service data in the time-frequency resource region and the relevant time-frequency resource region may include, but is not limited to, any one of the following.

1) The part or all of the service data in the time-frequency resource region and its relevant time-frequency resource region are unscrambled by using a preset scrambling code.

The preset scrambling code may include, but is not limited to, a Radio Network Temporary Identifier (RNTI), where the RNTI may include a Cell Radio Network Temporary Identifier (C-RNTI) or a new type RNTI (e.g., a customized RNTI). In this example, after part or all of the service data in the time-frequency resource region and its relevant time-frequency resource region are unscrambled by using the preset scrambling code, if the obtained service data is pre-agreed service data, the decoding is successful. Otherwise, the decoding fails.

2) The part or all of the service data in the time-frequency resource region and its relevant time-frequency resource region are unscrambled by using a preset scrambling code and a result of the unscrambling is verified.

The preset scrambling code may include, but is not limited to, an RNTI, where the RNTI may include a C-RNTI or a new type RNTI. In this example, after unscrambling part or all of the service data in the time-frequency resource region and its relevant time-frequency resource region by using the preset scrambling code, a verification, for example, a Cyclic Redundancy Check (CRC), may be further performed on the result of the unscrambling. If the unscrambling is successful and the verification is passed, the decoding is successful. Otherwise, the decoding fails.

3) The part or all of the service data in the time-frequency resource region and its relevant time-frequency resource region is verified.

In this example, a CRC may be performed on part or all of the service data in the time-frequency resource region and its relevant time-frequency resource region. If the verification is passed, the decoding is successful. Otherwise, the decoding fails.

It can be seen that in the example, part or all of the service data in the time-frequency resource region and its relevant time-frequency resource region may be decoded through a plurality of methods, the implementations being flexible and diverse.

At step S105, if the decoding is successful, it is determined that second service data preempts time-frequency resources of the first service data.

The second service data may include, but is not limited to, URLLC data. The second service has a higher priority than the first service, or in other words, the second service has higher demands for timeliness than the first service.

In the example, the time-frequency resource region corresponding to the first service data that fails to be received is determined, and a decoding is performed on part or all of the service data in the time-frequency resource region and its relevant time-frequency resource region. If the decoding is successful, it can be determined that the second service data preempts the time-frequency resources of the first service data, thereby determining time-frequency resource preemption between service data.

Figure 2:
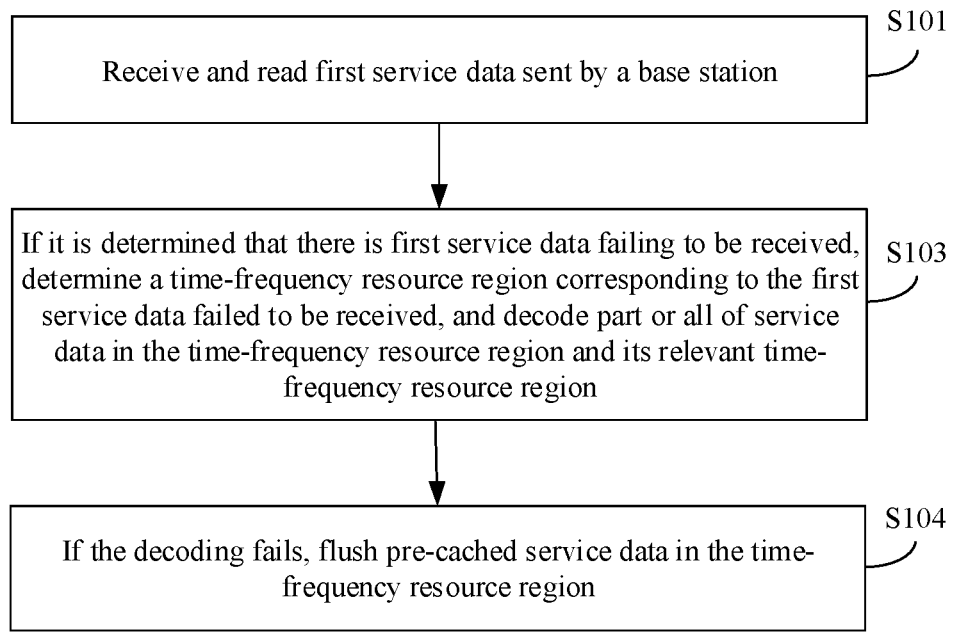
FIG. 2 is a flowchart illustrating another method of determining time-frequency resource preemption according to an example of the present application.

FIG. 2 is a flowchart illustrating another method of determining time-frequency resource preemption according to an example of the present application. As shown in FIG. 2, after the above step S103, the method may further include:

at step S104, if the decoding fails, pre-cached service data of the time-frequency resource region is flushed.

If the decoding fails, it is determined that the first service data fails to be received. Therefore, the pre-cached service data in the time-frequency resource region can be flushed.

In the example, after a decoding is performed on part or all of the service data in the time-frequency resource region and its relevant time-frequency resource region, if the decoding fails, the pre-cached service data in the time-frequency resource region is flushed, thereby saving cache space of the UE.

Figure 3:
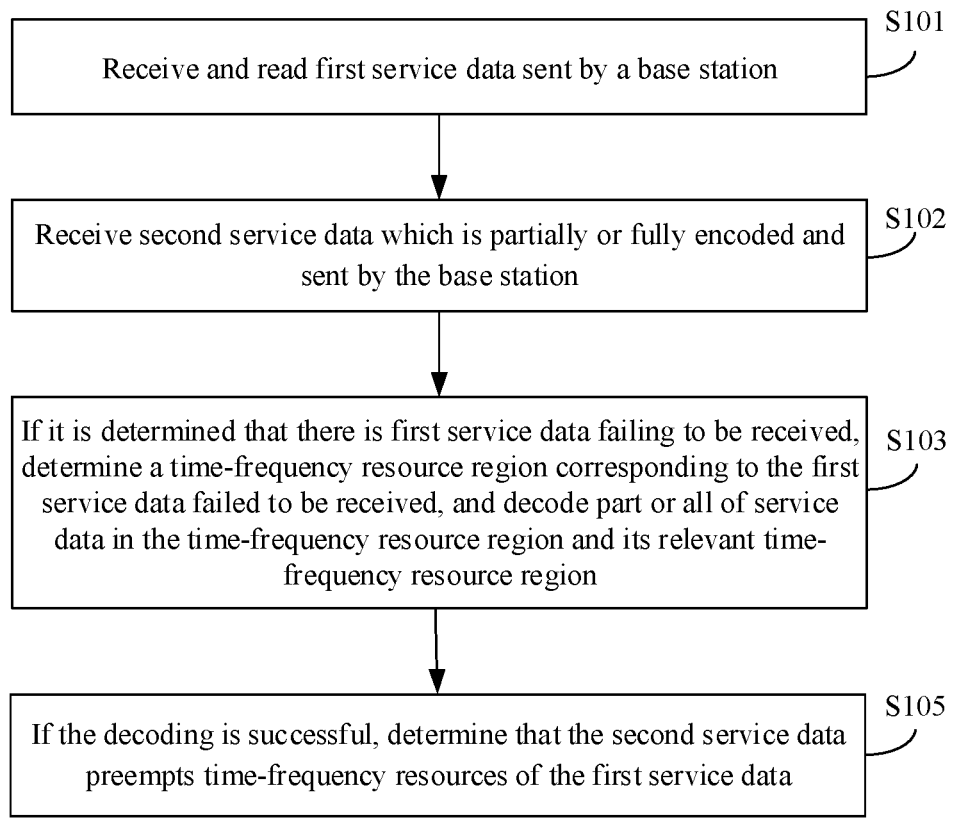
FIG. 3 is a flowchart illustrating another method of determining time-frequency resource preemption according to an example of the present application.

FIG. 3 is a flowchart illustrating another method of determining time-frequency resource preemption according to an example of the present application. As shown in FIG. 3, before the above step S103, the method may further include:

at step S102, second service data which is partially or fully encoded and sent by a base station is received.

In this example, after sending the first service data to the UE, the base station may send the second service data which is partially or fully encoded to the UE. A purpose of sending the second service data which is partially or fully encoded is that, after the UE decodes part or all of the service data in the time-frequency resource region corresponding to the first service data failing to be received and its relevant time-frequency resource region, the UE can determine whether the second service data preempts the time-frequency resources of the first service data.

In the example, the second service data which is partially or fully encoded and sent by the base station is received, thereby providing a condition for determining subsequently whether the second service data preempts the time-frequency resources of the first service data.

Figure 4:
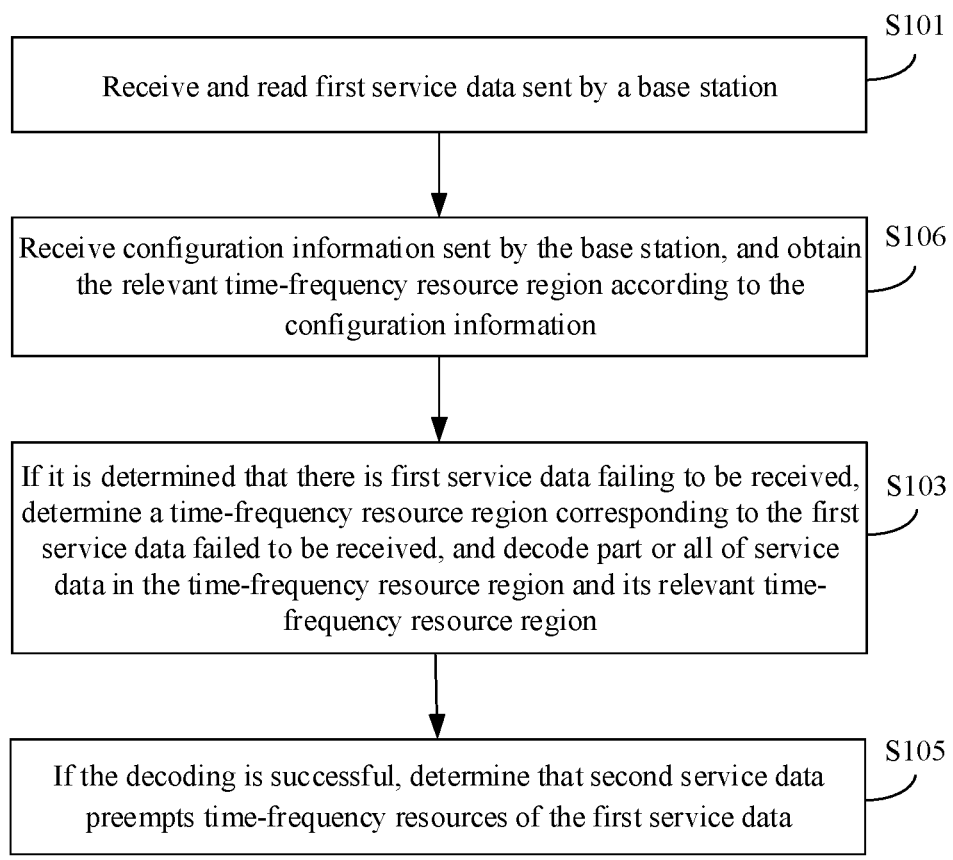
FIG. 4 is a flowchart illustrating another method of determining time-frequency resource preemption according to an example of the present application.

FIG. 4 is a flowchart illustrating another method of determining time-frequency resource preemption according to an example of the present application. As shown in FIG. 4, before the above step S103, the method may further include:

at step S106, configuration information sent by a base station is received, and the relevant time-frequency resource region is obtained according to the configuration information.

In this example, by receiving the configuration information sent by the base station, the relevant time-frequency resource region is obtained, so that a decoding can be performed on the part or all of the service data in the determined time-frequency resource region and the relevant time-frequency resource region.

In addition, the UE can also obtain the relevant time-frequency resource region through other methods, for example, obtaining the relevant time-frequency resource region through a prior agreement.

In the example, the configuration information sent by the base station is received and the relevant time-frequency resource region is obtained according to the configuration information, which is easy to implement.

Figure 5:
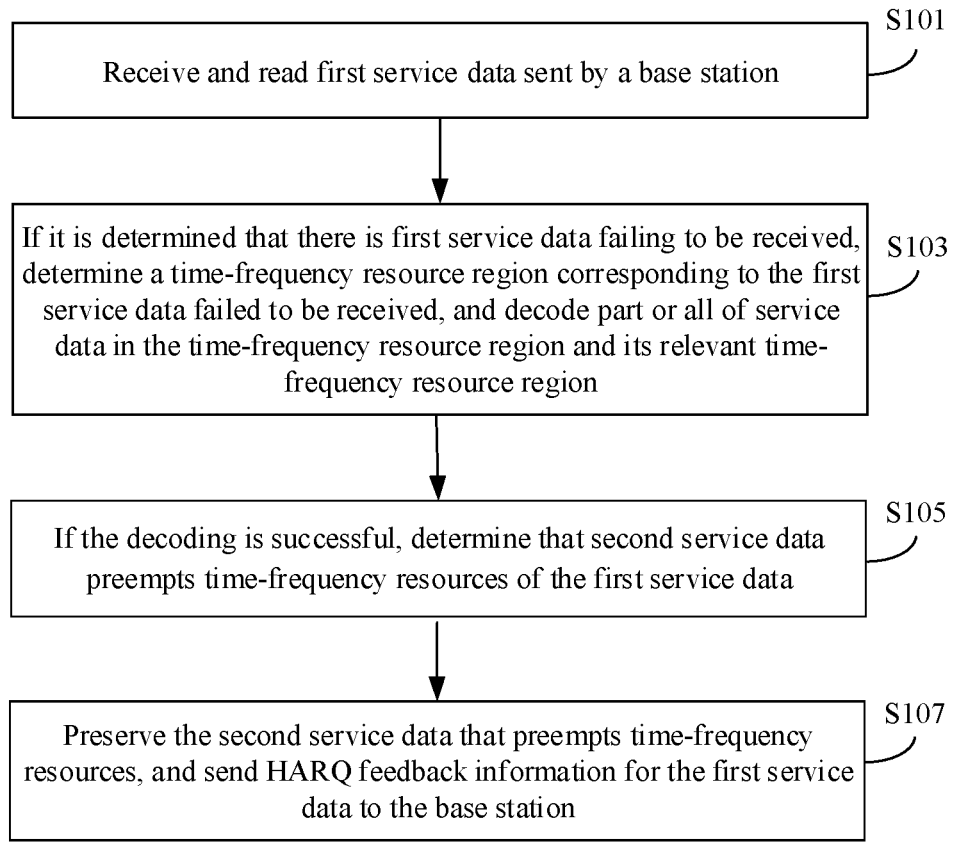
FIG. 5 is a flowchart illustrating another method of determining time-frequency resource preemption according to an example of the present application.

FIG. 5 is a flowchart illustrating another method of determining time-frequency resource preemption according to an example of the present application. As shown in FIG. 5, after the above step S105, the method may further include:

at step S107, the second service data that preempts time-frequency resources is preserved, and HARQ feedback information for the first service data is sent to the base station.

In this example, since the second service data that preempts time-frequency resources is useful data, the second service data that preempts time-frequency resources will not be flushed, or in other words, the UE preserves the second service data that preempts time-frequency resources.

In this example, the UE may send the HARQ feedback information for the first service data to the base station through a plurality of manners. For example, the HARQ feedback information may be sent to the base station through the following two manners.

In the first manner, the reception success/failure state of the first service data, whose time-frequency resources are preempted, may be set as reception success, and the HARQ feedback information is sent to the base station.

For example, the reception success/failure state of the eMBB data corresponding to CBG 4 in FIG. 1B may be set as reception success, the eMBB data corresponding to other CBGs may be fed back according to an existing manner. For example, the reception success/failure states of the eMBB data corresponding to other CBGs are all reception success. Corresponding HARQ feedback information is sent to the base station.

In the second manner, HARQ feedback information may be sent to the base station according to the reception success/failure state of first data other than the first service data whose time-frequency resources are preempted.

FIG. 1B is still taken as an example. In FIG. 1B, the eMBB data corresponding to CBG 4 is the first service data whose time-frequency resources are preempted, and the UE may send HARQ feedback information associated with CBG 1, CBG 2, CBG 3, CBG 5, CBG 6, CBG 7, and CBG 8 to the base station.

After receiving the HARQ feedback information sent by the UE, the base station may determine the eMBB data that fails to be sent according to the HARQ feedback information, and resent the eMBB data that fails to be sent.

It can be seen that, in this example, the HARQ feedback information may be sent to the base station through a plurality of manners, the implementations being flexible and diverse.

In the example, the second service data that preempts time-frequency resources is kept to reserve the useful second service data, so that the second service data can be normally transmitted. The HARQ feedback information for the first service data is sent to the base station, so that the base station can determine the eMBB data that fails to be sent according to the HARQ feedback information, thereby providing a condition for resending the eMBB data that fails to be sent.

Figure 6:
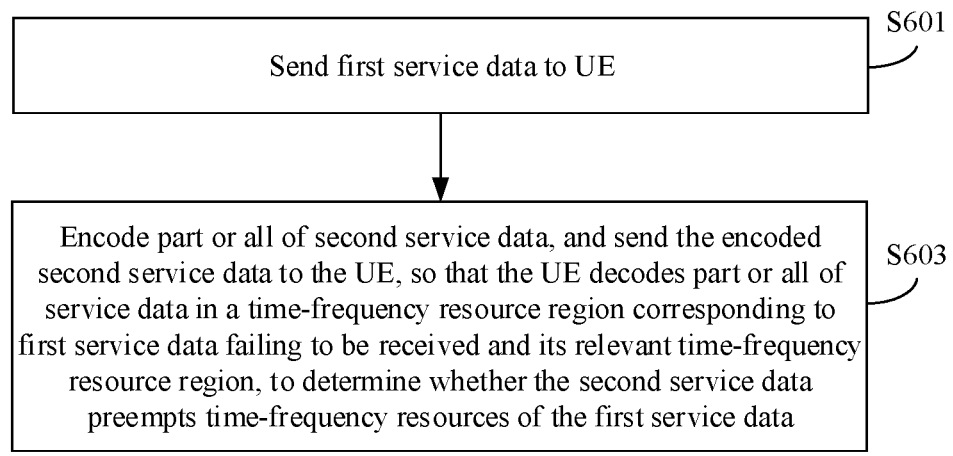
FIG. 6 is a flowchart illustrating yet another method of determining time-frequency resource preemption according to an example of the present application.

FIG. 6 is a flowchart illustrating yet another method of determining time-frequency resource preemption according to an example of the present application. The example is described from a base station side. As shown in FIG. 6, the method of determining time-frequency resource preemption include the followings.

At step S601, first service data is sent to UE.

The first service data may include, but is not limited to, eMBB data.

At step S603, part or all of second service data is encoded, and the encoded second service data is sent to the UE, so that the UE may decode part or all of service data in time-frequency resource region corresponding to first service data failing to be received and its relevant time-frequency resource region, to determine whether the second service data preempts time-frequency resources of the first service data.

In this example, that the part or all of second service data is encoded may include, but is not limited to, any one of the following.

1) The part or all of the second service data is scrambled by using a preset scrambling code.

In this example, the part or all of the second service data may be scrambled by using a preset scrambling code, where the preset scrambling code may include, but is not limited to, an RNTI, where the RNTI may include a C-RNTI or a new type RNTI. The scrambled second service data may periodically appear in time or frequency. As shown in FIG. 1B, the data to be decoded may be the scrambled second service data. As can be seen from FIG. 1B, the scrambled second service data periodically appears in frequency.

2) The part or all of the second service data is verified, and the verified second service data is scrambled by using a preset scrambling code.

In this example, a CRC may be first performed on the part or all of the second service data, and the verified second service data may be scrambled by using a preset scrambling code, where the preset scrambling code may include, but is not limited to, an RNTI, where the RNTI may include a C-RNTI or a new type RNTI. In this way, after receiving the scrambled second service data, the UE is to perform an unscrambling firstly and then perform a verification, which is beneficial to improving a success rate of determining that the second service data preempts the time-frequency resources of the first service data.

3) The part or all of the second service data is verified.

In this example, a CRC may be performed on the part or all of the second service data.

It can be seen that, in the example, the part or all of the second service data may be encoded through a plurality of methods, the implementations being flexible and diverse.

In the example, the part or all of the second service data is encoded, and the encoded second service data is sent to the UE, so that the UE may decode the part or all of the service data in the time-frequency resource region corresponding to the first service data failing to be received and its relevant time-frequency resource region, to determine whether the second service data preempts the time-frequency resources of the first service data.

Figure 7A:
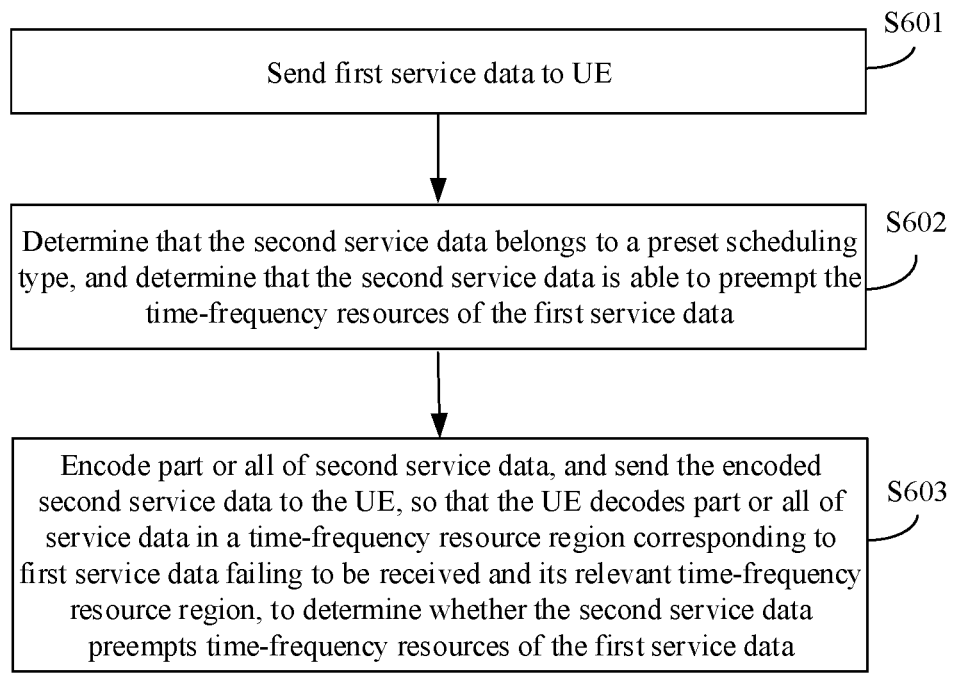
FIG. 7A is a flowchart illustrating still another method of determining time-frequency resource preemption according to an example of the present application.

FIG. 7A is a flowchart illustrating still another method of determining time-frequency resource preemption according to an example of the present application. As shown in FIG. 7A, before the above step S603, the method may further include:

at step S602, it is determined that the second service data belongs to a preset scheduling type and that the second service data is able to preempt the time-frequency resources of the first service data.

The preset scheduling type may include grant free, and the second service data may include, but is not limited to, URLLC data.

In this example, after determining that the second service data belongs to grant free and determining that the second service data can preempt the time-frequency resources of the first service data, the base station may encode the part or all of the second service data. The advantage is, if it is determined that the second service data cannot preempt the time-frequency resources of the first service data, the second service data may not be encoded, thereby saving computing resources of the base station.

In this example, if the time-frequency resource region used for scheduling the second service data is within the time-frequency resource region used for scheduling the first service data, it may be determined that the second service data can preempt the time-frequency resources of the first service data.

In the example, after determining that the second service data belongs to grant free and determining that the second service data can preempt the time-frequency resources of the first service data, the part or all of the second service data is encoded, which is advantageous to saving computing resources of the base station.

Figure 7B:
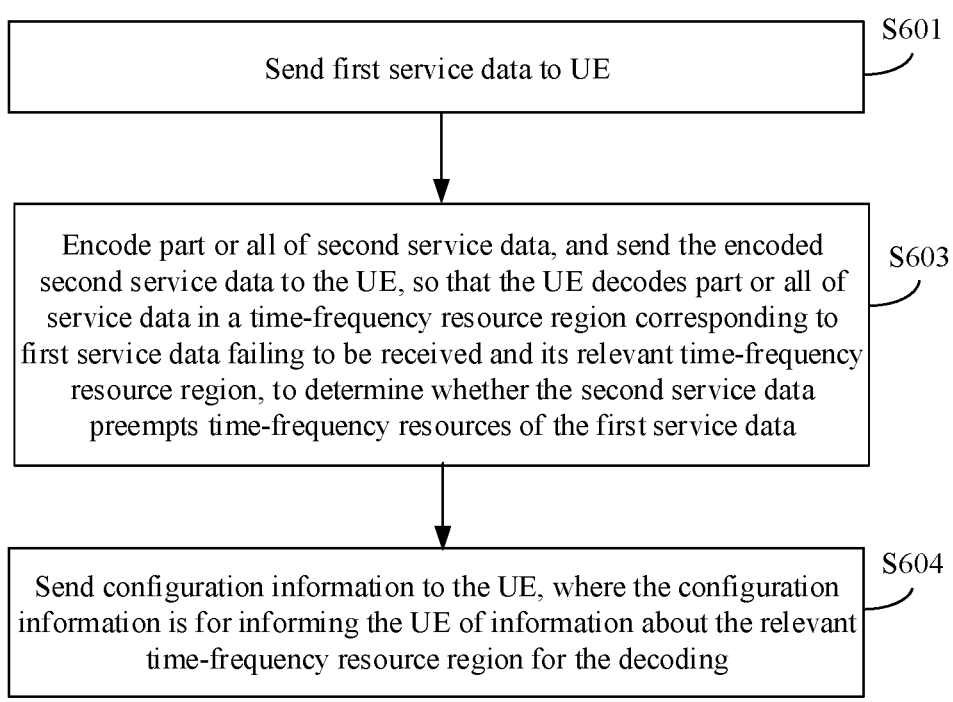
FIG. 7B is a flowchart illustrating still another method of determining time-frequency resource preemption according to an example of the present application.

FIG. 7B is a flowchart illustrating still another method of determining time-frequency resource preemption according to an example of the present application. As shown in FIG. 7B, after the above step S603, the method may further include:

at step S604, configuration information is sent to the UE, where the configuration information is for informing the UE of information about the relevant time-frequency resource region for the decoding.

In this example, by sending the configuration information to the UE, the UE may obtain the relevant time-frequency resource region according to the configuration information, so that a decoding may be performed on part or all of the service data in the determined time-frequency resource region and its relevant time-frequency resource region.

In the example, by sending the configuration information to the UE, the UE may obtain the relevant time-frequency resource region according to the configuration information, so that a decoding may be performed on part or all of the service data of the determined time-frequency resource region and its relevant time-frequency resource region.

Figure 8:
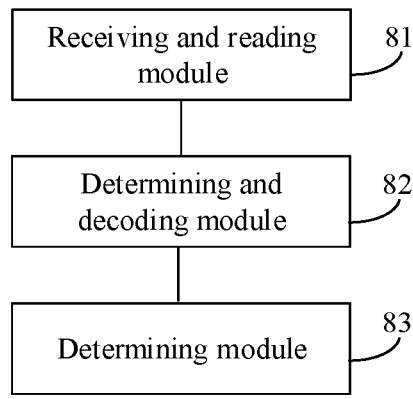
FIG. 8 is a block diagram illustrating a device for determining time-frequency resource preemption according to an example.

FIG. 8 is a block diagram illustrating a device for determining time-frequency resource preemption according to an example. As shown in FIG. 8, the device for determining time-frequency resource preemption includes: a receiving and reading module 81, a determining and decoding module 82, and a determining module 83.

The receiving and reading module 81 is configured to receive and read first service data sent by a base station.

In this example, UE may receive the first service data sent by the base station according to preset resource units. The preset resource units may include, but is not limited to, a subframe, a slot, a symbol, a CBG, and so on. The first service data may include but is not limited to eMBB data.

The determining and decoding module 82 is configured to determine a time-frequency resource region corresponding to first service data failing to be received, and decode part or all of service data in the time-frequency resource region and a relevant time-frequency resource region related thereto, when it is determined that there is the first service data failing to be received after the receiving and reading module 81 reads the first service data.

The time-frequency resource region corresponding to service data refers to a region corresponding to the time domain resources and the frequency domain resources occupied by the service data. The relevant time-frequency resource region of a time-frequency resource region refers to a time-frequency resource region related to at least one of a time domain and a frequency domain of the time-frequency resource region. A time-frequency resource region and its relevant time-frequency resource region usually share certain control information, which may include, but is not limited to, control information that periodically appears in time and frequency, such as a synchronization signal or a reference signal, etc. The relevant time-frequency resource region may include, but is not limited to, a time-frequency resource region adjacent to the time-frequency resource region. As shown in FIG. 1B, the time-frequency resource region corresponding to the first service data failing to be received is the time-frequency resource region corresponding to CBG 4, and an adjacent time-frequency resource region of the time-frequency resource region corresponding to CBG 4 is time-frequency resource region X in FIG. 1B. Include, but is not limited to, control information that periodically appears in time and frequency, such as a synchronization signal or a reference signal, etc.

The determining module 83 is configured to determine that the second service data preempts the time-frequency resources of the first service data, if the part or all of the service data in the time-frequency resource region and the relevant time-frequency resource region is successfully decoded by the determining and decoding module 82.

The second service data may include, but is not limited to, URLLC data. The second service has a higher priority than the first service, or in other words, the second service has higher demands for timeliness than the first service.

In the example, the time-frequency resource region corresponding to the first service data that fails to be received is determined, and a decoding is performed on part or all of the service data in the time-frequency resource region and its relevant time-frequency resource region. If the decoding is successful, it can be determined that the second service data preempts the time-frequency resources of the first service data, thereby determining time-frequency resource preemption between service data.

Figure 9A:
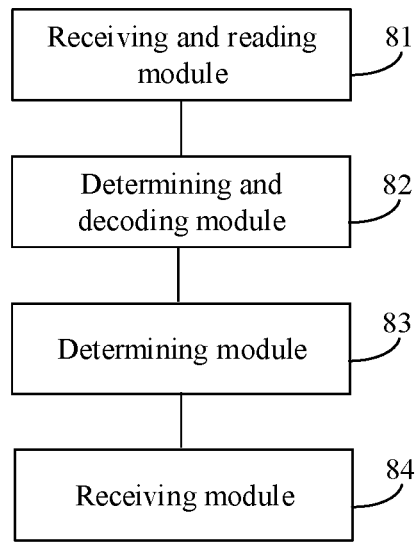
FIG. 9A is a block diagram illustrating another device for determining time-frequency resource preemption according to an example.

FIG. 9A is a block diagram illustrating another device for determining time-frequency resource preemption according to an example. As shown in FIG. 9A, on the basis of the example shown in FIG. 8, the device may further include: a receiving module 84.

The receiving module 84 is configured to receive the second service data which is partially or fully encoded and sent by the base station, before the determining and decoding module 82 decodes the part or all of the service data in the time-frequency resource region and the relevant time-frequency resource region.

In this example, after sending the first service data to the UE, the base station may send the encoded second service data to the UE. A purpose of sending the encoded second service data is that, after the UE decodes part or all of the service data in the time-frequency resource region corresponding to the first service data failing to be received and its relevant time-frequency resource region, the UE can determine whether the second service data preempts the time-frequency resources of the first service data.

In the example, the encoded second service data sent by the base station is received, thereby providing a condition for determining subsequently whether the second service data preempts the time-frequency resources of the first service data.

Figure 9B:
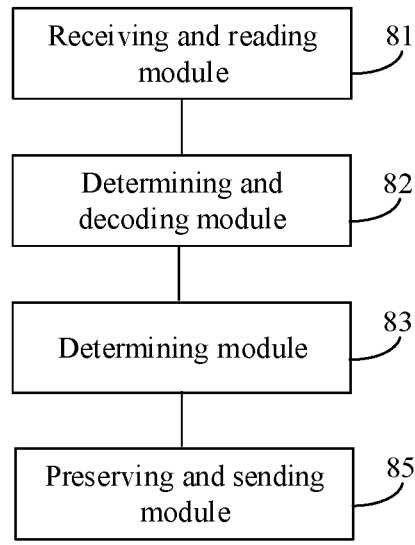
FIG. 9B is a block diagram illustrating another device for determining time-frequency resource preemption according to an example.

FIG. 9B is a block diagram illustrating another device for determining time-frequency resource preemption according to an example. As shown in FIG. 9B, on the basis of the example shown in FIG. 8, the device may further include: a preserving and sending module 85.

The preserving and sending module 85 is configured to preserve the second service data that preempts the time-frequency resources, and send HARQ feedback information for the first service data to the base station, after the determining module 83 determines that the second service data preempts the time-frequency resources of the first service data.

In this example, since the second service data that preempts time-frequency resources is useful data, the second service data that preempts time-frequency resources will not be flushed, or in other words, the UE preserves the second service data that preempts time-frequency resources.

In the example, the second service data that preempts time-frequency resources is kept to reserve the useful second service data, so that the second service data can be normally transmitted. The HARQ feedback information for the first service data is sent to the base station, so that the base station can determine the eMBB data that fails to be sent according to the HARQ feedback information, thereby providing a condition for resending the eMBB data that fails to be sent.

Figure 9C:
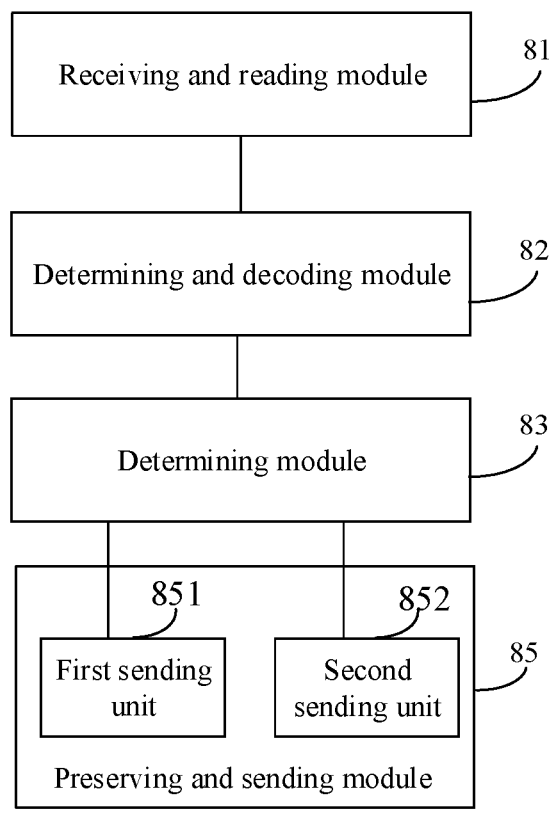
FIG. 9C is a block diagram illustrating another device for determining time-frequency resource preemption according to an example.

FIG. 9C is a block diagram illustrating another device for determining time-frequency resource preemption according to an example. As shown in FIG. 9C, on the basis of the example shown in FIG. 9B, the preserving and sending module 85 may include: a first sending unit 851 or a second sending unit 852.

The first sending unit 851 is configured to set reception success/failure state of the first service data, whose time-frequency resources are preempted, as reception success, and send the HARQ feedback information to the base station.

For example, the reception success/failure state of the eMBB data corresponding to CBG 4 in FIG. 1B may be set as reception success, the eMBB data corresponding to other CBGs may be fed back according to an existing manner. For example, the reception success/failure states of the eMBB data corresponding to other CBGs are all reception success. Corresponding HARQ feedback information is sent to the base station.

The second sending unit 852 is configured to send the HARQ feedback information to the base station according to reception success/failure state of first data other than the first service data whose time-frequency resources are preempted.

FIG. 1B is still taken as an example. In FIG. 1B, the eMBB data corresponding to CBG 4 is the first service data whose time-frequency resources are preempted, and the UE may send HARQ feedback information associated with CBG 1, CBG 2, CBG 3, CBG 5, CBG 6, CBG 7, and CBG 8 to the base station.

After receiving the HARQ feedback information sent by the UE, the base station may determine the eMBB data that fails to be sent according to the HARQ feedback information, and resent the eMBB data that fails to be sent.

In the example, the HARQ feedback information may be sent to the base station through a plurality of manners, the implementations being flexible and diverse.

Figure 9D:
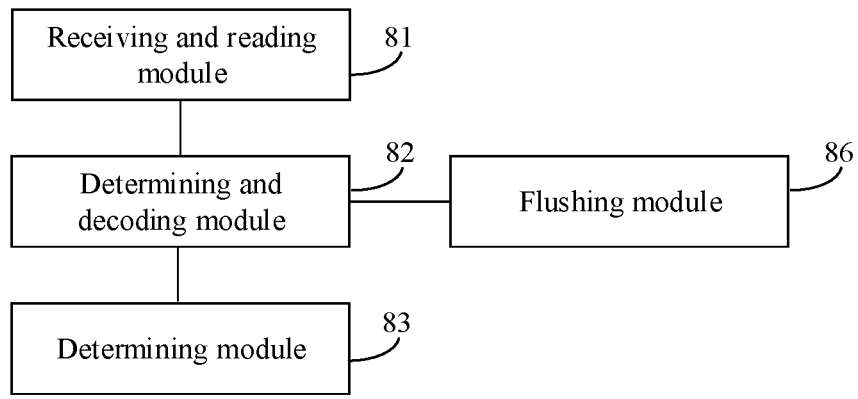
FIG. 9D is a block diagram illustrating another device for determining time-frequency resource preemption according to an example.

FIG. 9D is a block diagram illustrating another device for determining time-frequency resource preemption according to an example. As shown in FIG. 9D, on the basis of the example shown in FIG. 8, the device may further include: a flushing module 86.

The flushing module 86 is configured to flush pre-cached service data in the time-frequency resource region, if the part or all of the service data in the time-frequency resource region and the relevant time-frequency resource region is not successfully decoded by the determining and decoding module 82.

If the decoding fails, it is determined that the first service data fails to be received. Therefore, the pre-cached service data in the time-frequency resource region can be flushed.

In the example, after a decoding is performed on part or all of the service data in the time-frequency resource region and its relevant time-frequency resource region, if the decoding fails, the pre-cached service data in the time-frequency resource region is flushed, thereby saving cache space of the UE.

Figure 9E:
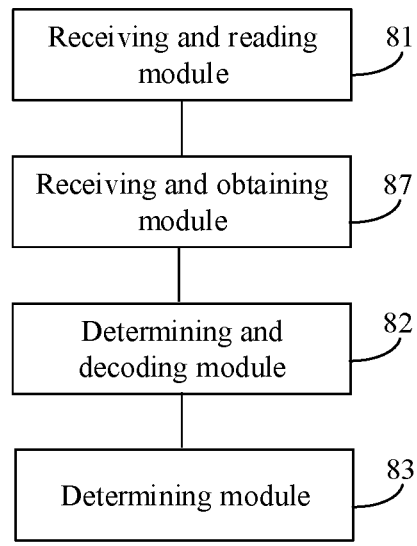
FIG. 9E is a block diagram illustrating another device for determining time-frequency resource preemption according to an example.

FIG. 9E is a block diagram illustrating another device for determining time-frequency resource preemption according to an example. As shown in FIG. 9E, on the basis of the example shown in FIG. 8, the device may further include: a receiving and obtaining module 87.

The receiving and obtaining module 87 is configured to receive configuration information sent by the base station, and obtain the relevant time-frequency resource region according to the configuration information, before the determining and decoding module 82 decodes the part or all of the service data in the time-frequency resource region and the relevant time-frequency resource region.

In this example, by receiving the configuration information sent by the base station, the relevant time-frequency resource region is obtained, so that a decoding can be performed on the part or all of the service data in the determined time-frequency resource region and the relevant time-frequency resource region.

In addition, the UE can also obtain the relevant time-frequency resource region through other methods, for example, obtaining the relevant time-frequency resource region through a prior agreement.

In the example, the configuration information sent by the base station is received and the relevant time-frequency resource region is obtained according to the configuration information, which is easy to implement.

Figure 9F:
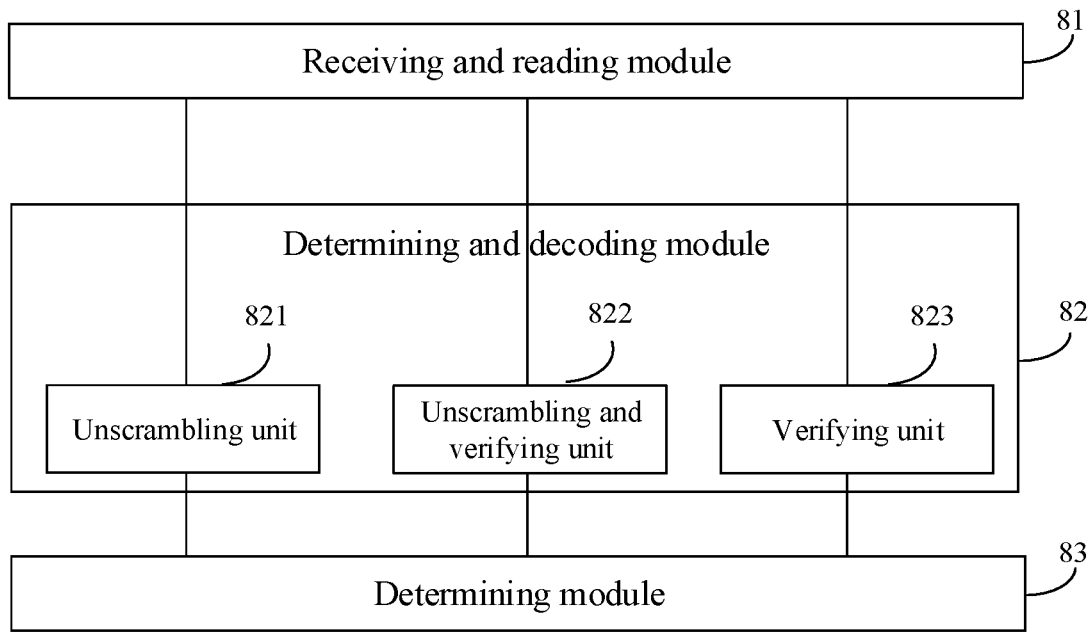
FIG. 9F is a block diagram illustrating another device for determining time-frequency resource preemption according to an example.

FIG. 9F is a block diagram illustrating another device for determining time-frequency resource preemption according to an example. As shown in FIG. 9F, on the basis of the example shown in FIG. 8, the determining and decoding module 82 may include: an unscrambling unit 821, an unscrambling and verifying unit 822, or a verifying unit 823.

The unscrambling unit 821 is configured to unscramble the part or all of the service data in the time-frequency resource region and the relevant time-frequency resource region by using a preset scrambling code.

The preset scrambling code may include, but is not limited to, a RNTI, where the RNTI may include a C-RNTI or a new type RNTI (e.g., a customized RNTI). In this example, after part or all of the service data in the time-frequency resource region and its relevant time-frequency resource region are unscrambled by using the preset scrambling code, if the obtained service data is pre-agreed service data, the decoding is successful. Otherwise, the decoding fails.

The unscrambling and verifying unit 822 is configured to unscramble the part or all of the service data in the time-frequency resource region and the relevant time-frequency resource region by using the preset scrambling code, and verify a result of the unscrambling.

The preset scrambling code may include, but is not limited to, an RNTI, where the RNTI may include a C-RNTI or a new type RNTI. In this example, after unscrambling part or all of the service data in the time-frequency resource region and its relevant time-frequency resource region by using the preset scrambling code, a verification, for example, a Cyclic Redundancy Check (CRC), may be further performed on the result of the unscrambling. If the unscrambling is successful and the verification is passed, the decoding is successful. Otherwise, the decoding fails.

The verifying unit 823 is configured to verify the part or all of the service data in the time-frequency resource region and the relevant time-frequency resource region.

In this example, a CRC may be performed on part or all of the service data in the time-frequency resource region and its relevant time-frequency resource region. If the verification is passed, the decoding is successful. Otherwise, the decoding fails.

In the example, part or all of the service data in the time-frequency resource region and its relevant time-frequency resource region may be decoded through a plurality of methods, the implementations being flexible and diverse.

Figure 10:
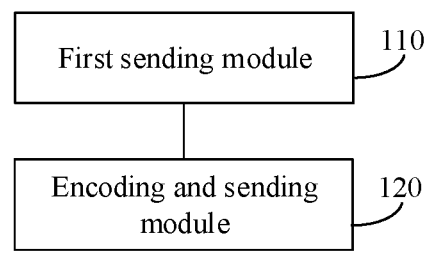
FIG. 10 is a block diagram illustrating yet another device for determining time-frequency resource preemption according to an example.

FIG. 10 is a block diagram illustrating yet another device for determining time-frequency resource preemption according to an example. As shown in FIG. 10, the device for determining time-frequency resource preemption includes: a first sending module 110 and an encoding and sending module 120.

The first sending module 110 is configured to send the first service data to UE.

The first service data may include, but is not limited to, eMBB data.

The encoding and sending module 120 is c configured to encode part or all of second service data, and send the encoded second service data to the UE after the first sending module 110 sends the first service data, so that the UE decodes part or all of service data in a time-frequency resource region corresponding to the first service data failing to be received and a relevant time-frequency resource region related thereto, to determine whether the second service data preempts time-frequency resources of the first service data.

In the example, the part or all of the second service data is encoded, and the encoded second service data is sent to the UE, so that the UE may decode the part or all of the service data in the time-frequency resource region corresponding to the first service data failing to be received and its relevant time-frequency resource region, to determine whether the second service data preempts the time-frequency resources of the first service data.

Figure 11A:
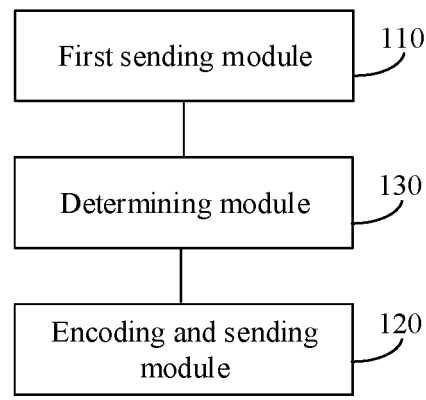
FIG. 11A is a block diagram illustrating still another device for determining time-frequency resource preemption according to an example.

FIG. 11A is a block diagram illustrating still another device for determining time-frequency resource preemption according to an example. As shown in FIG. 11A, on the basis of the example shown in FIG. 10, the device may further include: a determining module 130.

The determining module 130 is configured to determine that the second service data belongs to a preset scheduling type and determine that the second service data is able to preempt the time-frequency resources of the first service data, before the encoding and sending module 120 encodes the part or all of the second service data The determining module 130 may be configured to determine that the second service data is able to preempt the time-frequency resources of the first service data, when a time-frequency resource region used for scheduling the second service data is within a time-frequency resource region used for scheduling the first service data.

The preset scheduling type may include grant free, and the second service data may include, but is not limited to, URLLC data.

In this example, after determining that the second service data belongs to grant free and determining that the second service data can preempt the time-frequency resources of the first service data, the base station may encode the part or all of the second service data. The advantage is, if it is determined that the second service data cannot preempt the time-frequency resources of the first service data, the second service data may not be encoded, thereby saving computing resources of the base station.

In this example, if the time-frequency resource region used for scheduling the second service data is within the time-frequency resource region used for scheduling the first service data, it may be determined that the second service data can preempt the time-frequency resources of the first service data.

In the example, after determining that the second service data belongs to grant free and determining that the second service data can preempt the time-frequency resources of the first service data, the part or all of the second service data is encoded, which is advantageous to saving computing resources of the base station.

Figure 11B:
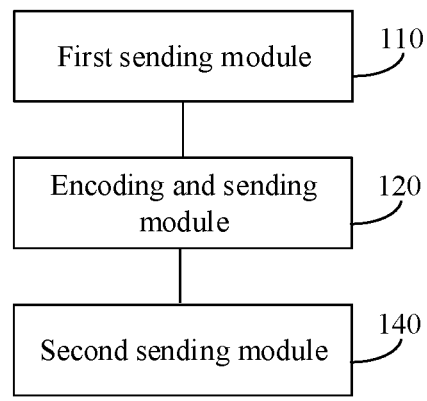
FIG. 11B is a block diagram illustrating still another device for determining time-frequency resource preemption according to an example.

FIG. 11B is a block diagram illustrating still another device for determining time-frequency resource preemption according to an example. As shown in FIG. 11B, on the basis of the example shown in FIG. 10, the device may further include: a second sending module 140.

The second sending module 140 is configured to send configuration information to the UE after the encoding and sending module 120 sends the encoded second service data to the UE, wherein the configuration information is for informing the UE of information about the relevant time-frequency resource region for the decoding.

In this example, by sending the configuration information to the UE, the UE may obtain the relevant time-frequency resource region according to the configuration information, so that a decoding may be performed on part or all of the service data in the determined time-frequency resource region and its relevant time-frequency resource region.

In the example, by sending the configuration information to the UE, the UE may obtain the relevant time-frequency resource region according to the configuration information, so that a decoding may be performed on part or all of the service data of the determined time-frequency resource region and its relevant time-frequency resource region.

Figure 11C:
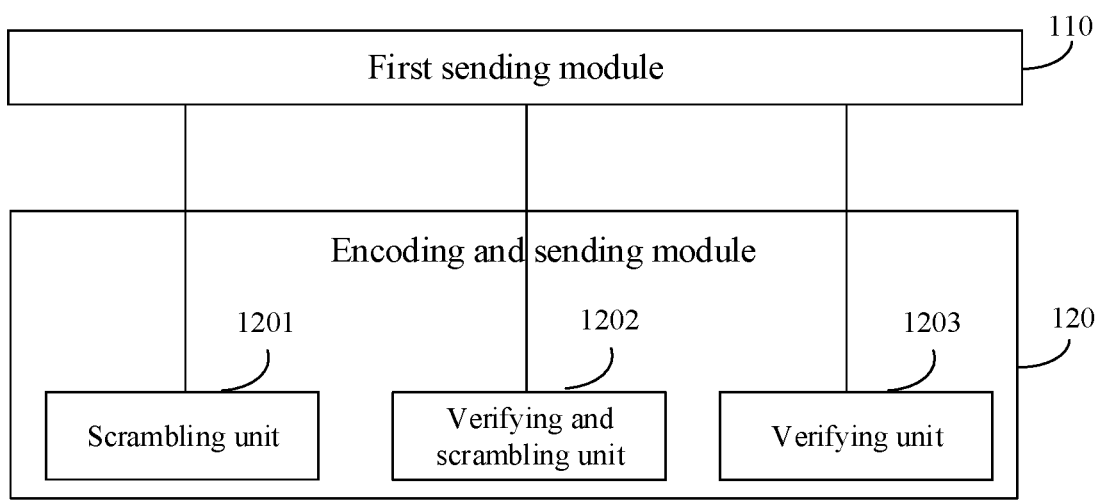
FIG. 11C is a block diagram illustrating still another device for determining time-frequency resource preemption according to an example.

FIG. 11C is a block diagram illustrating still another device for determining time-frequency resource preemption according to an example. As shown in FIG. 11C, on the basis of the example shown in FIG. 10, the encoding and sending module 120 may include: a scrambling unit 1201, a verifying and scrambling unit 1202, or a verifying unit 1203.

The scrambling unit 1201 is configured to scramble the part or all of the second service data by using a preset scrambling code.

In this example, the part or all of the second service data may be scrambled by using a preset scrambling code, where the preset scrambling code may include, but is not limited to, an RNTI, where the RNTI may include a C-RNTI or a new type RNTI. The scrambled second service data may periodically appear in time or frequency. As shown in FIG. 1B, the data to be decoded may be the scrambled second service data. As can be seen from FIG. 1B, the scrambled second service data periodically appears in frequency.

The verifying and scrambling unit 1202 is configured to verify the part or all of the second service data and scramble the verified second service data by using the preset scrambling code.

In this example, a CRC may be first performed on the part or all of the second service data, and the verified second service data may be scrambled by using a preset scrambling code, where the preset scrambling code may include, but is not limited to, an RNTI, where the RNTI may include a C-RNTI or a new type RNTI. In this way, after receiving the scrambled second service data, the UE is to perform an unscrambling firstly and then perform a verification, which is beneficial to improving a success rate of determining that the second service data preempts the time-frequency resources of the first service data.

The verifying unit 1203 is configured to verify the part or all of the second service data.

In this example, a CRC may be performed on the part or all of the second service data.

Figure 12:
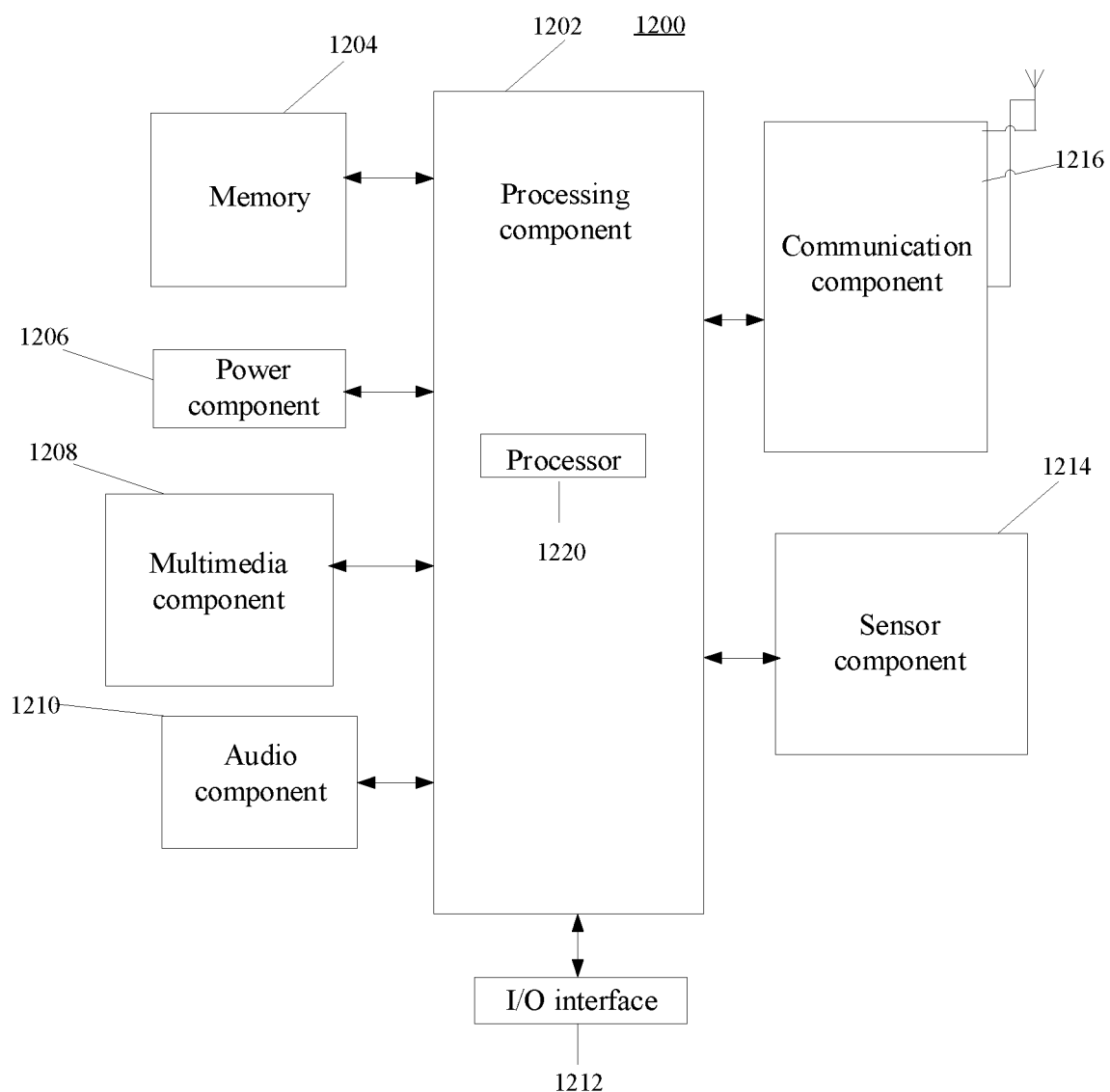
FIG. 12 is a block diagram illustrating a determining device suitable for time-frequency resource preemption according to an example.

In the example, the part or all of the second service data may be encoded through a plurality of methods, the implementations being flexible and diverse FIG. 12 is a block diagram illustrating a determining device suitable for time-frequency resource preemption according to an example. The apparatus 1200 may be user equipment, such as a mobile phone, a computer, a digital broadcast terminal, a messaging device, a game console, a tablet device, a medical device, a fitness device, a personal digital assistant, etc.

As shown in FIG. 12, the apparatus 1200 may include one or more of the following components: processing component 1202, memory 1204, power component 1206, multimedia component 1208, audio component 1210, input/output (I/O) interface 1212, sensor component 1214, and communication component 1216.

The processing component 1202 typically controls the overall operation of the apparatus 1200, such as operations associated with display, telephone calls, data communications, camera operations, and recording operations. The processing component 1202 may include one or more processors 1220 to execute instructions, in order to perform all or part of the steps of the methods described above. Further, the processing component 1202 may include one or more modules to facilitate interaction between the processing component 1202 and other components. The processing component 1202 may include, for example, a multimedia module, to facilitate interaction between the multimedia component 1208 and the processing component 1202.

The memory 1204 is to store various types of data to support the operation of the apparatus 1200. Examples of such data include instructions for any application or method operated on the apparatus 1200, contact data, telephone directory data, messages, pictures, videos and so on. The memory 1204 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power component 1206 provides power to the various components of the apparatus 1200. The power component 1206 may include, for example, a power management system, one or more power sources, and other components associated with generating, managing, and distributing power for the apparatus 1200.

The multimedia component 1208 includes a screen, serving to provide an output interface between the apparatus 1200 and a user. In some examples, the screen includes a Liquid Crystal Display (LCD) and a Touch Panel (TP). If the screen includes a touch panel, the screen can be implemented as a touch screen to receive input signals from the user. The touch panel includes one or more touch sensors to sense touches, slides, and gestures on the touch panel. The touch sensors can sense not only the boundary of the touches or the slides but also the duration and pressure associated with the touches or the slides. In some examples, the multimedia component 1208 includes a front camera and/or a rear camera. When the apparatus 1200 is in an operative mode, such as photo-taking mode or video-shooting mode, the front camera and/or the rear camera receives external multimedia data. Each front or rear camera is an optical lens system with a fixed focal length or optical zoom capabilities.

The audio component 1210 is configured to output and/or input audio signals. For example, the audio component 1210 includes a microphone (MIC) that is configured to receive external audio signals when the apparatus 1200 is in an operative mode, such as a calling mode, recording mode, and voice recognition mode. The received audio signals may be further stored in the memory 1204 or transmitted via communication component 1216. In some examples, the audio component 1210 also includes a speaker for outputting audio signals.

The I/O interface 1212 provides an interface between the processing component 1202 and the peripheral interface modules, which may be a keyboard, a click wheel, buttons, or the like. The buttons may include, but are not limited to, a home button, a volume button, a power-up button, and a screen lock button.

The sensor component 1214 includes one or more sensors to provide status assessments of various aspects for the apparatus 1200. For example, the sensor component 1214 may detect the on/off status of the apparatus 1200, and relative positioning of component, for example, the component is a display and a keypad of the apparatus 1200. The sensor component 1214 may also detect a change in position of the apparatus 1200 or a component of the apparatus 1200, a presence or absence of the contact between a user and the apparatus 1200, an orientation or an acceleration/deceleration of the apparatus 1200, and a change in temperature of the apparatus 1200. The sensor component 1214 may include a proximity sensor to detect the presence of a nearby object without any physical contact. The sensor component 1214 may further include an optical sensor, such as a Complementary Metal-Oxide-Semiconductor (CMOS) or Charged Coupled Device (CCD) image sensor which is used in imaging applications. In some examples, the sensor component 1214 may further include an acceleration sensor, a gyroscope sensor, a magnetic sensor, a pressure sensor, or a temperature sensor.

The communication component 1216 is to facilitate wired or wireless communication between the apparatus 1200 and other devices. The apparatus 1200 may access a wireless network based on a communication standard, such as Wi-Fi, 2G or 3G, or a combination thereof. In an example, the communication component 1216 receives a broadcast signal or broadcast related information from an external broadcast management system via a broadcast channel. In an example, the communication component 1216 may further include a Near Field Communication (NFC) module for promoting short-range communication. For example, the NFC module may be implemented based on a Radio Frequency Identification (RFID) technology, an Infrared Data Association (IrDA) technology, an Ultra-Wideband (UWB) technology, a Bluetooth® (BT) technology and other technologies.

In an example, the apparatus 1200 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the method described above.

In an example, there is further provided a non-transitory computer readable storage medium including instructions, such as the memory 1204 including instructions. The above instructions may be executed by the processor 1220 of the apparatus 1200 to complete the above method. For example, the non-transitory computer readable storage medium may be a Read-Only Memory (ROM), a Random Access Memory (RAM), a CD-ROM, a magnetic tape, a floppy disk, an optical data storage device, and so on.

Figure 13:
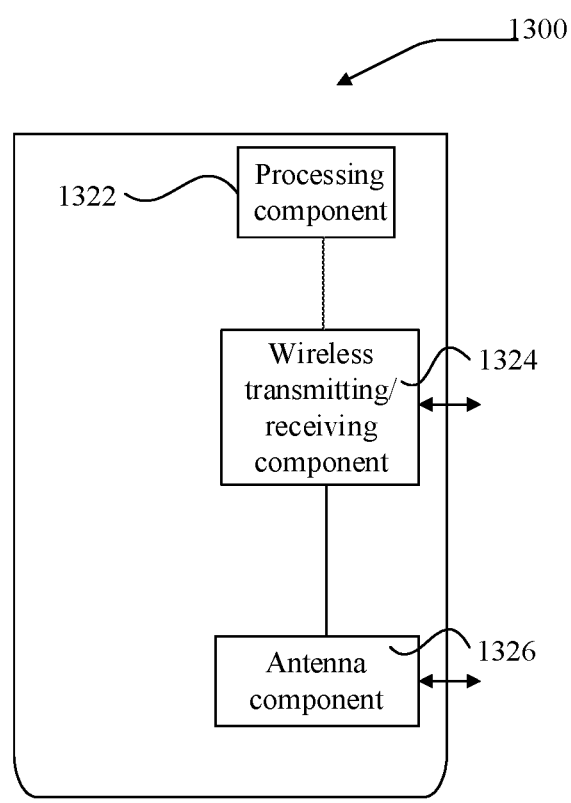
FIG. 13 is a block diagram illustrating another determining device suitable for time-frequency resource preemption according to an example.

FIG. 13 is a block diagram illustrating another determining device suitable for time-frequency resource preemption according to an example. A device 1300 can be provided as a base station. As shown in FIG. 13, the device 1300 includes a processing component 1322, a wireless transmitting/receiving component 1324, an antenna component 1326, and a signal processing portion specific to a wireless interface. The processing component 1322 further includes one or more processors.

One of the processors of the processing component 1322 is configured to:

send the first service data to UE; and encode part or all of second service data, and send the encoded second service data to the UE, so that the UE decodes part or all of service data in a time-frequency resource region corresponding to first service data failing to be received and a relevant time-frequency resource region related thereto, to determine whether the second service data preempts time-frequency resources of the first service data.

Since the device examples basically correspond to the method examples, reference may be made partially to the description of the method examples for relevant details. The device examples described above are merely illustrative, wherein the units described as separate components may or may not be physically separated, and the components displayed as units may or may not be physical units, e.g., they may be located in one place or distributed to multiple nodes in a network. Some or all of the modules may be selected according to actual needs to achieve the objectives of the examples. Those of ordinary skill in the art can understand and implement the examples without any creative effort.

It should be noted that, in the present disclosure, relational terms such as "first" and "second" are used merely to distinguish one entity or operation from another entity or operation, and do not necessarily require or imply that there is any such actual relationship or order between such entities or operations. Terms "include" and "comprise" are intended to include a non-exclusive inclusion, such that a process, method, item, or device that comprises a plurality of elements includes not only those elements but also other items not specifically listed, or elements that are inherent to such a process, method, item, or device. Without no more restrictions, an element defined by phrase "comprising a . . . " does not exclude the presence of additional equivalent elements in the process, method, item, or device that comprises the element.

Other embodiments of the present disclosure will be apparent to those skilled in the art after considering the specification and implementing the solutions disclosed herein. The present disclosure is intended to encompass any variations, uses, or adaptations of the present disclosure, which variations, uses, or adaptations are in accordance with the general principles of the present disclosure and include common general knowledge or common technical means in the art which are not disclosed in the present disclosure. The specification and examples are to be regarded as illustrative only, the true scope and spirit of the present disclosure are expressed by the following claims.

It is to be understood that the present disclosure is not limited to the accurate structures already described above and expressed in the accompanying drawings, and is subject to modifications and variations without exceeding its scope. The scope of the present disclosure is to be limited only by the appended claims.

The invention claimed is:

1. A method of determining time-frequency resource preemption, comprising:

receiving and reading, by a User Equipment (UE), first service data sent by a base station;

determining, by the UE, a time-frequency resource region corresponding to the first service data failing to be received upon determining that there is the first service data failing to be received, and decoding, by the UE, part or all of service data in the time-frequency resource region and a relevant time-frequency resource region related thereto;

determining, by the UE, that successful decoded service data belongs to second service data, and determining, by the UE, that the second service data preempts time-frequency resources of the first service data, upon determining that the decoding the part or all of the service data is successful; and preserving, by the UE, the second service data that preempts the time-frequency resources and sending, by the UE, Hybrid Automatic Repeat reQuest (HARQ) feedback information for the first service data to the base station after determining that the second service data preempts the time-frequency resources of the first service data;

wherein decoding, by the UE, the part or all of the service data in the time-frequency resource region and the relevant time-frequency resource region comprises:

unscrambling the part or all of the service data in the time-frequency resource region and the relevant time-frequency resource region by using a preset scrambling code, and verifying a result of the unscrambling, wherein the preset scrambling code comprises a Radio Network Temporary Identifier (RNTI), and the RNTI comprises a Cell Radio Network Temporary Identifier (C-RNTI) or a new type RNTI;

wherein sending the HARQ feedback information for the first service data to the base station comprises:

setting a reception success/failure state of the first service data, whose time-frequency resources are preempted, as reception success, and sending the HARQ feedback information to the base station.

2. The method according to claim 1, further comprising:

receiving, by the UE, the second service data which is partially or fully encoded and sent by the base station prior to decoding the part or all of the service data in the time-frequency resource region and the relevant time-frequency resource region.

3. The method according to claim 1, wherein sending, by the UE, the HARQ feedback information for the first service data to the base station further comprises:

sending the HARQ feedback information to the base station according to a reception success/failure state of first data other than the first service data whose time-frequency resources are preempted.

4. The method according to claim 1, wherein prior to decoding the part or all of the service data in the time-frequency resource region and the relevant time-frequency resource region, the method further comprises:

receiving, by the UE, configuration information sent by the base station, and obtaining, by the UE, the relevant time-frequency resource region according to the configuration information.

5. A method of determining time-frequency resource preemption, comprising:

sending, by a base station, first service data to User Equipment (UE); and encoding, by the base station, part or all of second service data, and sending, by the base station, encoded second service data to the UE, so that the UE decodes part or all of the second service data in a time-frequency resource region corresponding to the first service data failing to be received and a relevant time-frequency resource region related thereto, to determine whether the second service data preempts time-frequency resources of the first service data, and the UE preserves the second service data that preempts the time-frequency resources after determining that the second service data preempts the time-frequency resources of the first service data;

wherein encoding, by the base station, the part or all of the second service data comprises:

verifying the part or all of the second service data, and scrambling the verified second service data by using a preset scrambling code, wherein the preset scrambling code comprises a Radio Network Temporary Identifier (RNTI), and the RNTI comprises a Cell Radio Network Temporary Identifier (C-RNTI) or a new type RNTI;

wherein the method further comprises:

receiving, by the base station, Hybrid Automatic Repeat reQuest (HARQ) feedback information for the first service data from the UE, wherein a reception success/failure state of the first service data, whose time-frequency resources are preempted, is set as reception success.

6. The method according to claim 5, further comprising:
determining, by the base station, that a scheduling type of the second service data belongs to a grant free type prior to encoding the part or all of the second service data; and determining, by the base station, that the second service data is able to preempt the time-frequency resources of the first service data.

7. The method according to claim 6, wherein determining, by the base station, that the second service data is able to preempt the time-frequency resources of the first service data comprises:
determining that the second service data is able to preempt the time-frequency resources of the first service data upon determining that a time-frequency resource region used for scheduling the second service data is within a time-frequency resource region used for scheduling the first service data.

8. The method according to claim 5, further comprising:
sending, by the base station, configuration information to the UE upon sending the encoded second service data to the UE, wherein the configuration information is for informing the UE of information about the relevant time-frequency resource region for the decoding.

9. User Equipment (UE), comprising:
at least one processor; and
a memory for storing instructions executable by the at least one processor,
wherein the at least one processor is configured to:
receive and read first service data sent by a base station;
determine a time-frequency resource region corresponding to the first service data failing to be received upon determining that there is first service data failing to be received, and decode part or all of service data in the time-frequency resource region and a relevant time-frequency resource region related thereto;
determine that successful decoded service data belongs to second service data and determine that the second service data preempts time-frequency resources of the first service data upon determining that the decoding the part or all of the service data is successful; and
preserve the second service data that preempts the time-frequency resources and send Hybrid Automatic Repeat reQuest (HARQ) feedback information for the first service data to the base station after determining that the second service data preempts the time-frequency resources of the first service data;

wherein the at least one processor is configured to decode the part or all of the service data in the time-frequency resource region and the relevant time-frequency resource region comprises that the at least one processor is configured to:

unscramble the part or all of the service data in the time-frequency resource region and the relevant time-frequency resource region by using a preset scrambling code, and verify a result of the unscrambling, wherein the preset scrambling code comprises a Radio Network Temporary Identifier (RNTI), and the RNTI comprises a Cell Radio Network Temporary Identifier (C-RNTI) or a new type RNTI;

wherein sending the HARQ feedback information for the first service data to the base station comprises:

setting a reception success/failure state of the first service data, whose time-frequency resources are preempted, as reception success, and sending the HARQ feedback information to the base station.

10. The UE according to claim 9, wherein the at least one processor is further configured to:
receive the second service data which is partially or fully encoded and sent by the base station, prior to decoding the part or all of the service data in the time-frequency resource region and the relevant time-frequency resource region.

11. The UE according to claim 9, wherein the at least one processor is configured to send the HARQ feedback information for the first service data to the base station by performing acts further comprising:
sending the HARQ feedback information to the base station according to a reception success/failure state of first data other than the first service data whose time-frequency resources are preempted.

12. The UE according to claim 9, wherein prior to decoding the part or all of the service data in the time-frequency resource region and the relevant time-frequency resource region, the at least one processor is further configured to:
receive configuration information sent by the base station, and obtain the relevant time-frequency resource region according to the configuration information.

13. A base station, comprising:
at least one processor; and
a memory for storing instructions executable by the at least one processor,
wherein the at least one processor is configured to:
send first service data to User Equipment (UE); and
encode part or all of second service data, and send the encoded second service data to the UE, so that the UE decodes part or all of the second service data in a time-frequency resource region corresponding to first service data failing to be received and a relevant time-frequency resource region related thereto, to determine whether the second service data preempts time-frequency resources of the first service data, and the UE preserves the second service data that preempts the time-frequency resources after determining that the second service data preempts the time-frequency resources of the first service data;

wherein the at least one processor is configured to encode the part or all of the second service data comprises that the at least one processor is configured to:

verify the part or all of the second service data, and scramble the verified second service data by using a preset scrambling code, wherein the preset scrambling code comprises a Radio Network Temporary Identifier (RNTI), and the RNTI comprises a Cell Radio Network Temporary Identifier (C-RNTI) or a new type RNTI;

wherein the at least one processor is further configured to:

receive Hybrid Automatic Repeat reQuest (HARQ) feedback information for the first service data from the UE, wherein a reception success/failure state of the first service data, whose time-frequency resources are preempted, is set as reception success.

14. The base station according to claim 13, wherein the at least one processor is further configured to:

determine that a scheduling type of the second service data belongs to a grant free type prior to encoding the part or all of the second service data, and determine that the second service data is able to preempt the time-frequency resources of the first service data.

15. The base station according to claim 13, wherein the at least one processor is further configured to:

send configuration information to the UE upon sending the encoded second service data to the UE, wherein the configuration information is for informing the UE of information about the relevant time-frequency resource region for the decoding.

* * * * *